United States Patent [19]

Iyer et al.

[11] Patent Number: 5,057,340
[45] Date of Patent: Oct. 15, 1991

[54] METHOD OF FORMING A COATING ON A REACTOR COOLANT PUMP SEALING SURFACE

[75] Inventors: Natraj C. Iyer, Monroeville; Eleanor Gettliffe, Murrysville, both of Pa.

[73] Assignee: Westinghouse Electric Corp., Pittsburgh, Pa.

[21] Appl. No.: 512,244

[22] Filed: Apr. 20, 1990

[51] Int. Cl.$^5$ .............................................. B05D 3/12
[52] U.S. Cl. .................... 427/367; 376/203; 419/49; 419/9; 419/14; 419/19; 427/370; 427/376.3; 427/383.7; 427/404; 427/419.2; 427/419.3; 427/419.7; 427/405
[58] Field of Search .................. 376/203; 419/49, 9, 419/14, 19; 427/419.1, 405, 419.7, 419.2, 383.3, 367, 370, 376.3, 404, 419.3

[56] References Cited

U.S. PATENT DOCUMENTS

| | | |
|---|---|---|
| 3,611,546 | 10/1971 | Haller ........................ 29/429 |
| 4,107,392 | 8/1978 | Aoki et al. .................. 428/547 |
| 4,121,770 | 10/1978 | Straaup et al. ............. 239/224 |
| 4,150,998 | 4/1979 | Morelock .................... 106/44 |
| 4,280,841 | 7/1981 | Ito et al. .................... 75/203 |
| 4,281,931 | 5/1983 | Hunold et al. ............. 65/18.1 |
| 4,614,724 | 9/1986 | Knock et al. ............... 501/87 |
| 4,748,826 | 6/1988 | Laumen ..................... 62/260 |
| 4,909,841 | 3/1990 | Iyer et al. ................... 75/233 |

OTHER PUBLICATIONS

Co-Pending application Ser. No. 379,196 filed May 7, 1982 in the name of N. Bonhomme.
Co-Pending application Ser. No. 063,331 filed Jun. 17, 1987 in the name of R. F. Guardiani et al.
Co-Pending application Ser. No. 035,832 filed Apr. 8, 1987 in the name of G. Zottola et al.
Co-Pending application Ser. No. 091,224 filed Aug. 31, 1987 in the name of C. P. Nyilas et al.
Co-Pending application Ser. No. 197,174 filed May 23, 1988 in the name of D. J. Janocko.
Co-Pending application Ser. No. 222,649 filed Jul. 21, 1988 in the name of J. D. Fornoff.
Co-Pending application Ser. No. 231,039 filed Mar. 12, 1988 in the name of D. J. Janocko.
Co-Pending application Ser. No. 07/296,654 filed Jan. 13, 1989 in the name of Elmer E. Eiffler.

*Primary Examiner*—Robert L. Stoll
*Assistant Examiner*—Nina Bhat

[57] ABSTRACT

A ceramic-based coating is provided on a sealing surface of a sealing assembly component by processing and applying a powder mixture of ceramic particles and metal binder, encasing the coating of powder on the sealing surface by applying a metallic cover thereover, evacuating the atmosphere between the cover and coating, hot isostatic pressing the component and coating, cooling the component and coating, and after cooling thereof removing the cover from the coating. The powder processing includes mixing the ceramic particles and metal binder to produce a mixture, pretreating the mixture by heating it to the melting point of the metal binder which is less than the melting point of the ceramic particles to produce a mass of ceramic particles coated with molten metal binder and having a reduced gas content, cooling the mass of ceramic particles coated with molten metal binder to produce a solid mass thereof, and pulverizing the solid mass of metal binder coated-ceramic particles to granulate the powder mixture of ceramic particles to the desired size and still at least partially coated with metal binder. The resultant coating is densified substantially to its full theoretical density, metallurgically bonded to the substrate exterior surface, and has ceramic particles which are interparticle bonded together due to the processing step.

18 Claims, 6 Drawing Sheets

METHOD OF FORMING A COATING ON A REACTOR COOLANT PUMP SEALING SURFACE

CROSS REFERENCE TO RELATED APPLICATIONS

Reference is hereby made to the following copending applications and issued patents dealing with related subject matter and assigned to the assignee of the present invention:

1. "Sealing Devices For The Drive Shaft Of A High Pressure Fluid Pump" by N. Bonhomme, assigned U.S. Ser. No. 379,196 and filed May 17, 1982. (W.E. 50,341)
2. "Reactor Coolant Pump Hydrostatic Sealing Assembly With Improved Hydraulic Balance" by R. F. Guardiani et al, assigned U.S. Ser. No. 063,331 and filed June 17, 1987. (W.E. 53,459)
3. "Reactor Coolant Pump Sealing Surface With Titanium Nitride Coating" by G. Zottola et al, assigned U.S. Ser. No. 035,832 and filed Apr. 8, 1987. (W.E. 53,460)
4. "Reactor Coolant Pump Hydrostatic Sealing Assembly With Externally Pressurized Hydraulic Balance Chamber" by C. P. Nyilas et al, assigned U.S. Ser. No. 091,224 and filed Aug. 31, 1987. (W.E. 53,912)
5. "Reactor Coolant Pump Shaft Seal Utilizing Shape Memory Metal" by D. J. Janocko, assigned U.S. Ser. No. 197,174 and filed May 23, 1988. (W.E. 54,387)
6. "Reactor Coolant Pump Auxiliary Seal For Reactor Coolant System Vacuum Degasification" by J. D. Fornoff, assigned U.S. Ser. No. 222,649 and filed July 21, 1988. (W.E. 54,388)
7. "Reactor Coolant Pump Having Double Dam Seal With Self-Contained Injection Pump Mechanism" by D. J. Janocko, assigned U.S. Ser. No. 231,039 and filed Aug. 12, 1988. (W.E. 54,444)
8. "Method Of Treating A Coating On A Reactor Coolant Pump Sealing Surface" by Elmer E. Eiffler et al, assigned U.S. Ser. No. 07/296,654 and filed Jan. 13, 1989. (W.E. 54,029)

BACKGROUND OF THE INVENTION

1. Field of the Invention

The present invention relates generally to shaft seals and, more particularly, is concerned with a method of forming a coating on seal surface in a nuclear reactor coolant pump.

2. Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft. Their combined purpose is to mechanically contain the high positive pressure coolant of the reactor coolant system from leakage along the pump shaft to the containment atmosphere during normal operating condition. Representative examples of pump shaft sealing assemblies known in the prior art are the ones disclosed in U.S. Pat. No. 3,522,948 to Mac-Crum, Singleton U.S. Pat. No. 3,529,838, Villasor U.S. Pat. No. 3,632,117, Andrews et al U.S. Pat. No. 3,720,222, Boes U.S. Pat. No. 4,275,891, Jenkins U.S. Pat. No. 4,690,612 and Quinn U.S. Pat. No. 4,693,481 and in the first three patent applications cross-referenced above, all of which are assigned to the same assignee as the present invention.

Historically, the pump shaft seals constitute the main problem area for the reactor coolant pumps and significantly contribute to the utilization factor in nuclear power plants. The seals must be capable of breaking down the high system pressure (about 2500 psi) safely. The tandem arrangement of the three seals is used to break down the pressure, with the lower primary seal absorbing most of the pressure drop (approximately 2250 psi). The lower primary sealing assembly is the main seal of the pump. It is typically a hydrostatic, "film-riding", controlled leakage seal whose primary components are an annular runner which rotates with the pump shaft and a non-rotating seal ring which remains stationary with the pump housing. Whereas the components of the lower primary sealing assembly are not intended to contact or rub together, corresponding components of the middle and upper sealing assemblies, a rotating runner and non-rotating seal ring, provide contacting or rubbing seals.

Heretofore, the runner components of the rub-type sealing assemblies (the middle secondary and upper tertiary sealing assemblies) have been composed of a stainless steel substrate having an outer coating of chromium carbide on the surface of the runner components which rubs against the seal ring. The coating is formed by depositing chromium carbide powder on the stainless steel substrate using a detonation gun technique. Bonding between the coating and the substrate is achieved purely by mechanical impact forces when the powdered chromium carbide is impinged onto the substrate. The density of the coating thus applied is typically less than 100% of theoretical.

The chromium carbide coating thus formed has proven to be less than satisfactory. Blistering has been observed to occur on the chromium carbide coated runners. The blistering is caused by contact with corrosive materials making up the nuclear water chemistry employed in nuclear reactors, such as chlorine or sulfur bearing compounds. These corrosive materials penetrate through the pores of the chromium carbide coating to the stainless steel/coating interface. Hydrogen gas formation caused by the corrosive mechanism then results eventually in a spalling, or blistering, of the coating's surface. Thus, the blistering is attributed to the inherent porosity heretofore present in the coating and the lack of optimum bonding at the stainless steel/coating interface.

One recent approach to improving the chromium carbide coating is disclosed in the last patent application cross-referenced above, also assigned to the same assignee as the present invention. After the molten powder is deposited as a coating on the stainless steel substrate by using the detonation gun, it is encased and hot isostatic pressing (HIP) is applied in order to densify the coating to substantially its full theoretical density. In the HIP processing step, the coating is subjected to a high pressure-temperature cycle which eliminates pores and produces a sintering of the coating for providing a metallurgical bonding between constituent materials of the coating. However, the highest temperature reached during the HIP processing step is generally not more than two-thirds of the melting points of constituent materials of the coating so that release of gases within the encased coating is avoided.

Even though this approach represents a step in the right direction toward eliminating pores in the applied coating and thereby reducing blistering, the use of the detonation gun technique to deposit the coating to the substrate imposes limitations on the quality of the bonding achieved between the coating and substrate. The powder which will form the coating is a mixture of a ceramic and a metal binder which both must be in a molten state to be sprayed using the detonation gun technique. The detonation gun applies the molten mixture in splats which cool very fast once they deposit on the substrate. The cooled splats produce a coating which has suboptimal interparticle bonding and is susceptible to microcracking and delamination in a thermal cyclical environment.

The subsequent application of hot isostatic pressing to the deposited chromium carbide coating densifies the coating but generally fails to rectify the problems created by use of the detonation gun. Consequently, a need exists for improvement of the above-described recent approach so that further improvement of the applied coating can be realized.

SUMMARY OF THE INVENTION

The present invention provides an improved method of forming a coating on a substrate so as to satisfy the aforementioned needs. The wear resistant, corrosion-/erosion resistant and thermal characteristics of the seal provided by the coating is enhanced through formation of an improved interparticle bond between the constituents of the coating and improved bonding between the coating and substrate as well as improved densification of the coating. The present invention eliminates the use of plasma spray deposition by the detonation gun technique. Instead, the powder which will form the coating is deposited in either loosely or in a partly consolidated condition as a preform. A processing of the powder is introduced which permits elimination of the use of the detonation gun technique.

More particularly, the processing of the powder reduces the gas content of the powder mixture, provides the powder as a mixture of ceramic particles at least partially thinly coated with metal binder, eliminates the need to deposit the powder as a molten spray by the detonation gun technique, and permits elevation of the temperature of the deposited powder forming the coating to close to the melting point of the metal binder constituent during the HIP processing step followed by a controlled cooling of the coating and substrate to achieve the improved interparticle bond and improved bonding between the coating and substrate.

Accordingly, the present invention is directed to a method of forming a coating on a sealing surface of a sealing assembly component, such as for use in a nuclear reactor coolant pump. The forming method comprises the steps of: (a) processing a powder composed of a mixture of ceramic particles and a metal binder so as to substantially reduce the gas content of the mixture and at least partially coat the ceramic particles with the metal binder; (b) applying the powder mixture onto a groove formed on the sealing surface of the sealing assembly component to form a coating thereon; (c) encasing at least the coating on the sealing surface by applying a metallic cover thereover; (d) evacuating the atmosphere between the cover and coating on the sealing surface; and (e) hot isostatic pressing the sealing assembly component and the coating thereon encased by the cover in a manner which densifies the coating to substantially its full theoretical density, metallurgically bonds the coating to the surface of the sealing assembly component at the groove thereon, and wets the ceramic particles with the metal binder and forms an interparticle bond between the ceramic particles wetted by the metal binder.

Additionally, the forming method comprises the steps of: (f) cooling at a predetermined rate the sealing assembly component and the coating thereon encased by the cover; and (g) after cooling thereof, removing the cover from the coating. For example, the cooling is carried out at a rate of about 100 degrees C. per hour.

More particularly, the step of processing the powder includes mixing the ceramic particles and metal binder to produce a mixture thereof, heating the mixture of ceramic particles and metal binder to the melting point of the metal binder which is less than the melting point of the ceramic particles to produce a mass of ceramic particles coated with molten metal binder and having a reduced gas content, cooling the mass of ceramic particles coated with molten metal binder to produce a solid mass thereof, and pulverizing the solid mass of metal binder coated-ceramic particles to granulate the powder mixture of ceramic particles to the desired size and still at least partially coated with metal binder. The step of applying the powder mixture includes either depositing the powder mixture in a loose condition, or depositing the powder mixture in a partly consolidated condition as a preform.

Further, the hot isostatic pressing of the sealing assembly component and the coating thereon encased by the cover is at an elevated temperature below but close to the melting point of the metal binder so as to be sufficient to cause wetting of the ceramic particles by the metal binder. Preferably, the elevated temperature of the hot isostatic pressing is within 200° C. of the melting point of the metal binder.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Figure 1:
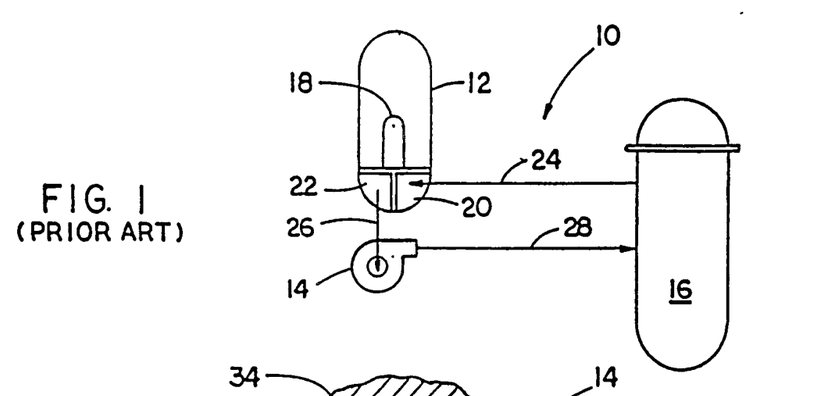
FIG. 1 is a schematic representation of one cooling loop of a conventional nuclear reactor coolant system which includes a steam generator and a reactor coolant pump connected in series in a closed coolant flow circuit with the reactor core.

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2500 psi.

Figure 2:
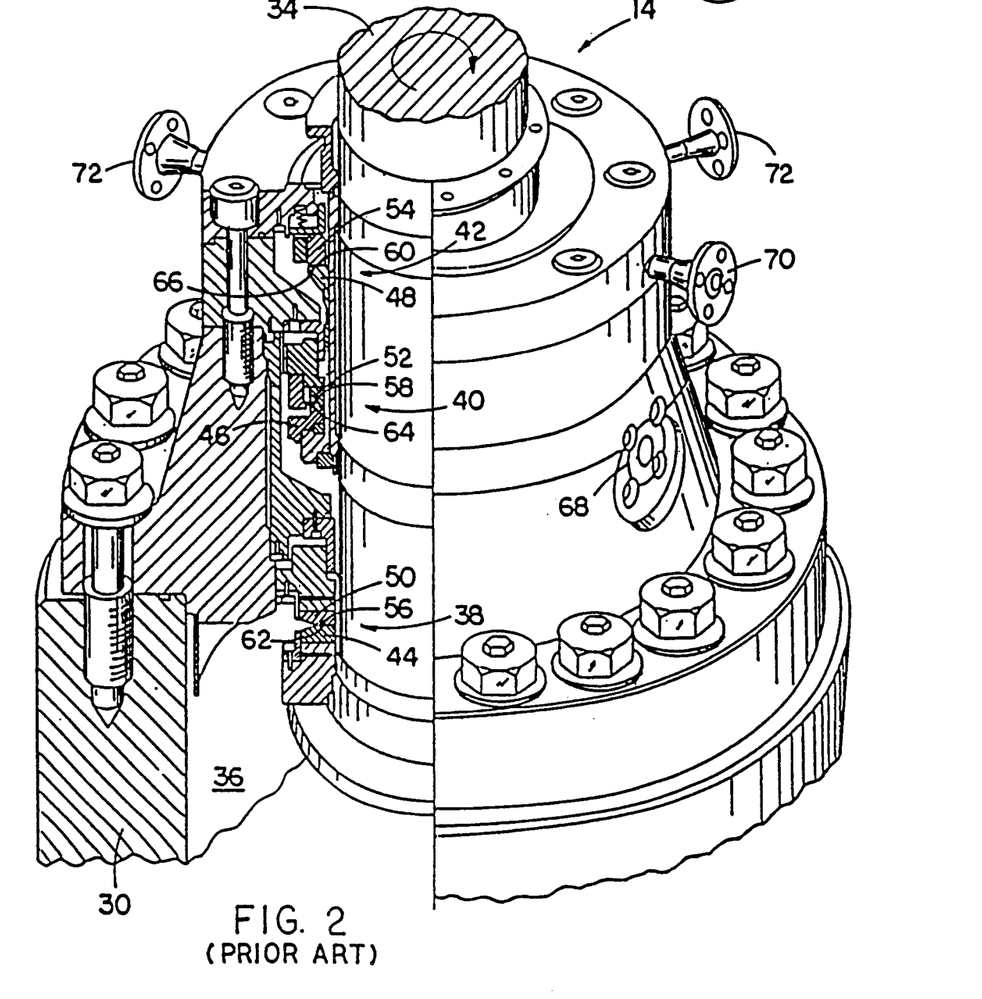
FIG. 2 is a cutaway perspective view of the shaft seal section of a conventional reactor coolant pump, illustrating in cross-section the seal housing and the lower primary, middle secondary and upper tertiary sealing assemblies which are disposed within the seal housing and surround the pump shaft in this section of the pump.
Figure 3:
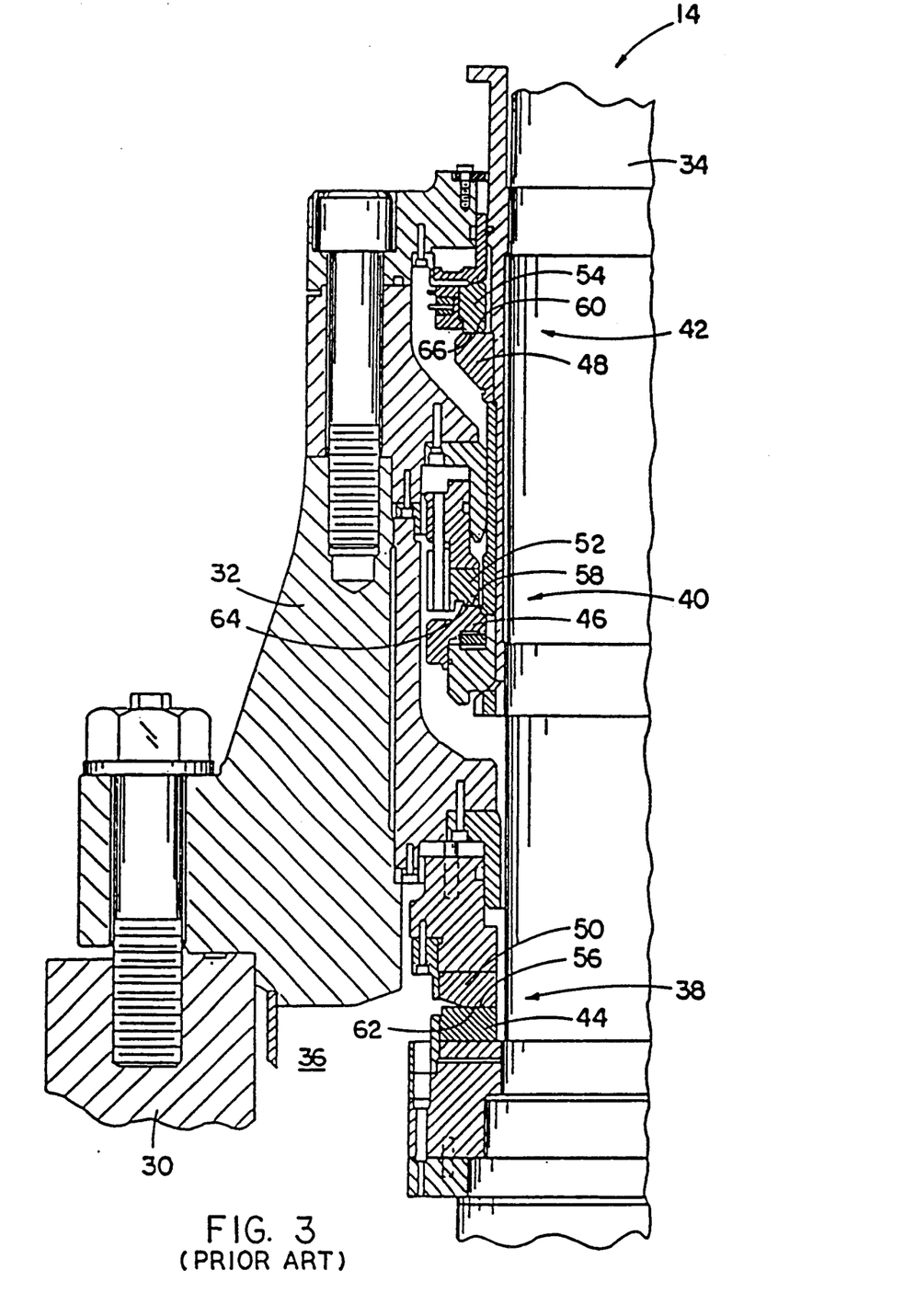
FIG. 3 is an enlarged axial sectional view of the seal housing and sealing assemblies of the reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2500 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2500 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas secondary and tertiary leakoff ports 70,72 accommodate coolant fluid leakoff from secondary and tertiary sealing assemblies 40,42.

Coating Formation Method for Improved Inter Particle Bonding

Figure 4:
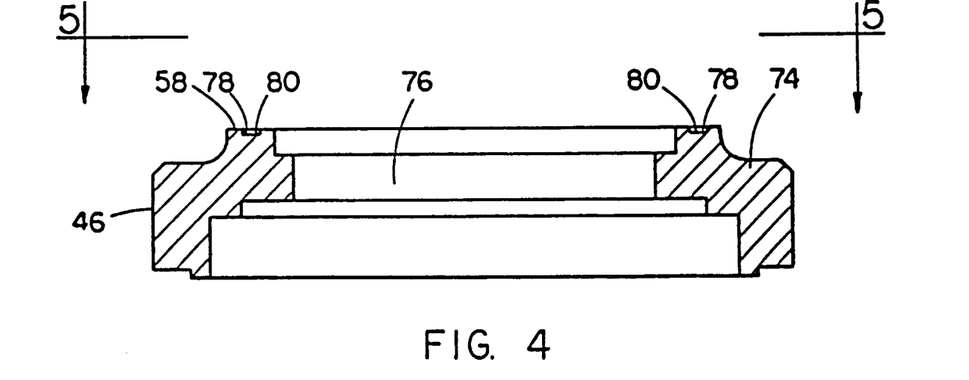
FIG. 4 is an enlarged axial sectional view of the runner of the middle sealing assembly of the reactor coolant pump of FIG. 3, illustrating a coating deposited on the top end surface of the runner.
Figure 5:
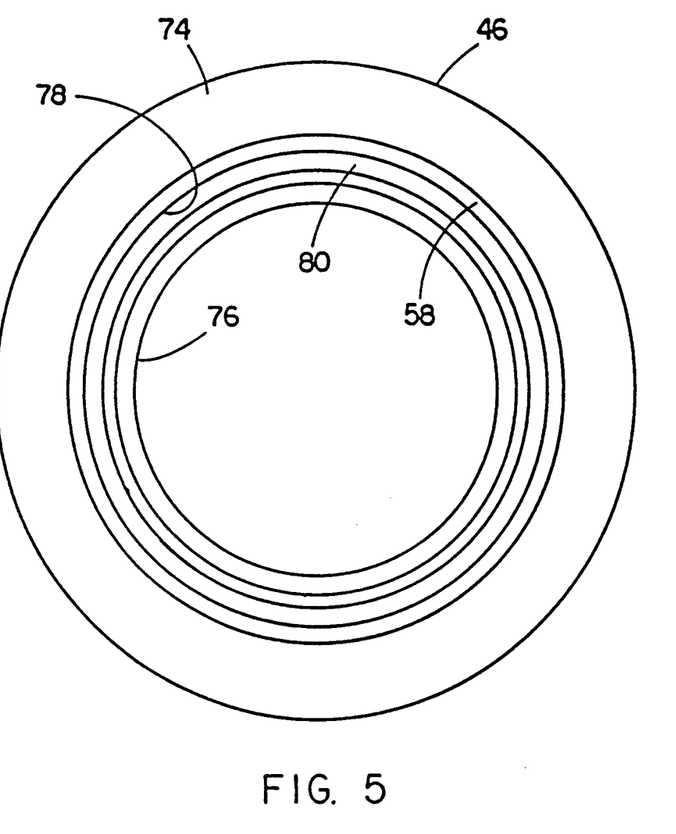
FIG. 5 is a top plan view of the runner as seen along line 5—5 of FIG. 4.

Turning now to FIGS. 4 and 5, there is shown the annular runner 46 of the rubbing-type secondary sealing assembly 40. The runner 46 is in the form an annular substrate 74 composed of stainless steel, such as 304, 316 or 410 types, having a central opening 76. Also, the exterior top rubbing sealing surface 58 on the substrate 74 has an annular groove 78 formed thereon. By way of example, the groove 78 is about 0.007 inch deep and $\frac{1}{2}$ inch wide.

In accordance with the coating forming method of the present invention, a coating 80, preferably composed of particles of one or more ceramic or refractory materials coated with one or more metal binders, is applied to fill the annular groove 78 on the exterior surface 58 and face outwardly therefrom. In the illustrated example, the applied coating 80 has a thickness within the range of about 0.006 to 0.008 inch. The same coating is applied to a groove on the runner 48 of the rubbing-type tertiary sealing assembly 42. Thus, the coating formation method of the present invention is applicable to both of the runners 46,48.

Figure 6:
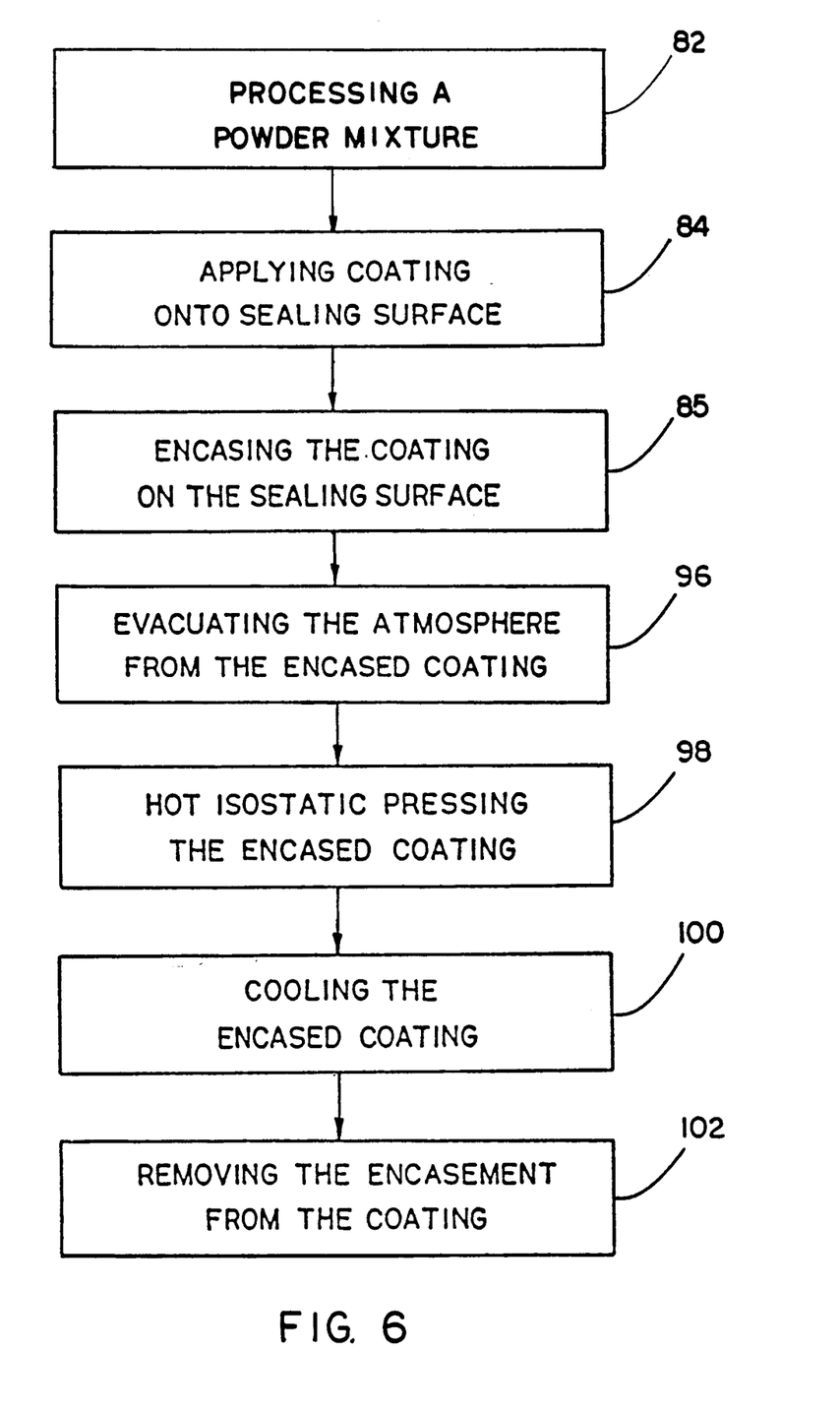
FIG. 6 is a flow chart illustrating the steps in the coating formation method of the present invention.

For enhancement of wear resistant, corrosion/erosion resistant and thermal characteristics of the seal provided by the coating 80, the coating forming method of the present invention as depicted by the flow chart in FIG. 6 is used. Block 82 depicts the initial step of the method involving the processing of a powder composed of a mixture of ceramic particles and a metal binder. The processing to be described in detail later on pre-treats the powder so as to substantially reduce the gas content of the mixture and at least partially coat the ceramic particles with the metal binder.

Block 84 shows the second step of the method which is applying the powder mixture onto the groove 78 of the runner substrate surface 58 to form the coating 80 thereon. The applying step can be performed either by depositing the powder mixture in a loose condition or in a partly consolidated condition as a preform insert.

Figure 7:
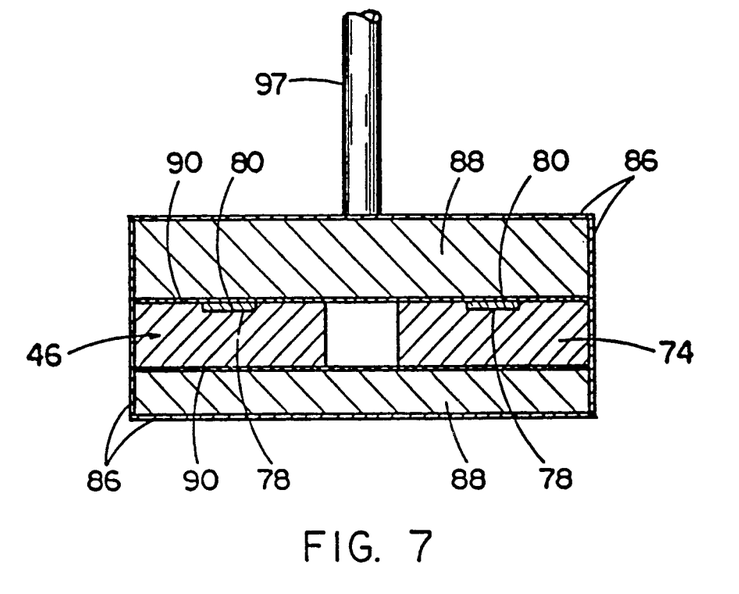
FIG. 7 is a schematical axial sectional view of one set of components for carrying out the hot isostatic pressing step of the coating formation method of the present invention wherein the entire coating and substrate are encased.
Figure 8:
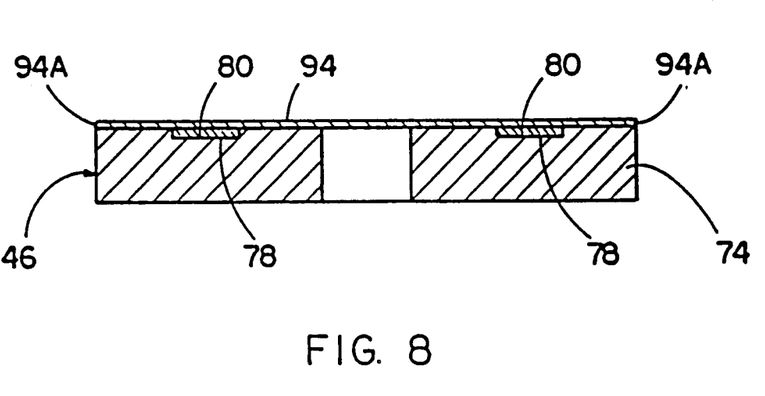
FIG. 8 is a schematical axial sectional view of another set of components for carrying out the hot isostatic pressing step of the coating formation method of the present invention wherein only the coating on the substrate is encased.

Block 85 in FIG. 6 shows the third step in the forming method which involves encasing the coating 80 on the sealing surface 58. One of two alternatives can be used for encasing the coating. In FIG. 7, both the substrate 74 and coating 80 are encased by enclosing or containerizing the runner substrate 74 and coating 80 thereon in a sealed container 86, composed of a suitable material such as stainless steel or molybdenum. Also, preferably, a ceramic insert or powder 88 together with a molybdenum sheet 90 is placed between the interior of the container 86 and each of the top and bottom surfaces 58, 92 of the runner 46 to ensure separation of the runner from the container 86. On the other hand, in FIG. 8, only the coating 80 is encased and sealed from the external atmosphere by a cover 94, composed of a suitable material such as stainless steel or molybdenum, welded such as by an electron beam at its opposite edges 94A to the substrate 74. Block 96 in FIG. 6 depicts the fourth step in the forming method which is evacuating the atmosphere via a pipe 97 seen in FIG. 7 from between the container 86 or cover 94 and coating 80 on the runner substrate sealing surface 58.

Block 98 depicts the fifth step in the forming method which involves hot isostatic pressing the runner substrate 74 and coating 80 thereon encased by the container 86 or cover 94 in order to densify the coating 80 to substantially its full theoretical density and metallurgically bond the coating 80 to the surface 58 of the runner substrate 74 in the groove 78 thereon. More particularly, the runner substrate 74 with the coating 80 thereon are placed in a conventional hot isostatic press (not shown) and subjected to a high pressure-temperature cycle. The material of the container 86 or cover 94 is capable of withstanding the high pressure-temperature cycle. Preferably, the hot isostatic pressing is carried out at a pressure within the range of 5,000–30,000 psi.

One improved feature provided by the present invention relates to performance of the hot isostatic pressing step of block 98 at an elevated temperature below but close to the melting point of the metal binder for producing wetting of the ceramic particles with the metal binder and thereby forming an interparticle bond between the ceramic particles wetted by the metal binder. The elevated temperature is preferably within 100° C. of the melting point of the metal binder. For example, where the metal binder is NiCr, the elevated temperature would be within 200° C. of its melting point of 1394° C.

Block 100 in FIG. 6 describes the sixth step in the forming method which is cooling the runner substrate 74 with the coating 80 thereon encased by the container 86 or cover 94. In order to alleviate problems associated with the differential thermal expansion coefficients of the substrate and coating, the thermal heating and cooling should be controlled to approximately 100 degrees C. per hour. In other words, cooling is preferably carried out at a rate of about 100 degrees C., per hour.

Upon completion of the HIP and cooling steps, the container 86 or cover 94 are removed as depicted by the block 102 depicting the seventh step of the forming method in FIG. 6. The runner substrate 74 and coating 80 are then cleaned and finish machined.

Figure 9:
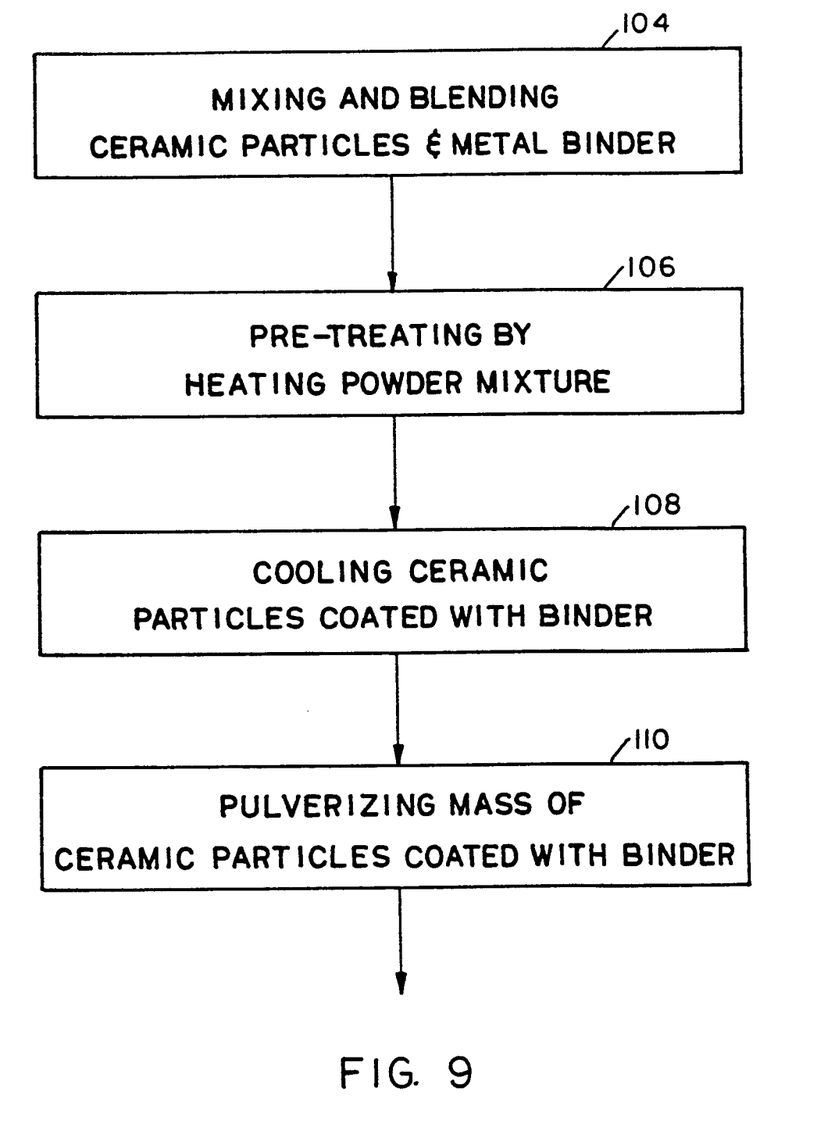
FIG. 9 is a flow chart illustrating the sub-steps composing the powder processing step of the coating formation method of the present invention.

Referring to FIG. 9, there is illustrated a flow chart made up of the sub-steps composing the initial powder processing step of the coating formation method of the present invention, as depicted in block 82 of the flow chart of FIG. 6. The first sub-step of processing the powder, as depicted by block 104 of FIG. 9, is mixing and blending the ceramic particles and metal binder to produce a desired mixture thereof in the desired proportions. The amount of metal binder used, ordinarily ranging between 15–40% by weight of the mixture, should be the minimum required to promote good wetting of the ceramic particles in the above-described HIP step. One example of the constituents of a suitable mixture is CrC and NiCr. Other ceramics, such as WC—Co—Cu, $Al_2O_3$ and $Si_3N_4$, and metal binders, such as Co and Ni, are possible depending upon the particular application. The selection of the binder is predicated by the compatibility with the ceramic and its erosion/wear characteristics for the particular application.

The second sub-step of processing the powder mixture, as shown by block 106 of FIG. 9, is pretreating the mixture by heating the mixture of ceramic particles and metal binder to the melting point of the metal binder which is less than the melting point of the ceramic particles to produce a mass of ceramic particles coated with molten metal binder and having a reduced gas content. This step ensures that each ceramic particle is typically surrounded by a layer of the binder.

Blocks 108 and 110 of FIG. 9 depict the third and fourth sub-steps of processing the powder mixture which are respectively cooling the mass of ceramic particles coated with molten metal binder to produce a solid mass thereof, and pulverizing the solid mass of metal binder coated-ceramic particles to granulate the powder mixture of ceramic particles to the desired size. The granulated ceramic particles are still at least partially coated with metal binder. The powder mixture is now ready for the HIP step depicted by block 98 in FIG. 6 and as described earlier. At this point, the powder has low gas content, and at the same time has the surface characteristics that will promote good wetting and interparticle bonding during the HIP step.

Advantages of Coating Formation Method of Present Invention

In conclusion, the main advantages of the coating formation method depicted by the flow diagram of FIG. 6 are as follows:

(1) Near full density, e.g. CrC+NiCr seals/clads can be obtained, thus the gaseous pores which accelerate the corrosion mechanism and spalling are eliminated.

(2) There is little or no oxidation of the CrC+NiCr resulting in improved interparticle bond, alleviating the tendency to delaminate/spall and improving thermal shock resistance.

(3) The clad (coating 80) will be in a compression state of stress, a condition conducive to non-initiation of cracks and delamination.

(4) The control of the HIP pressure-temperature cycle will result in good interdiffusion at the seal (clad)-/substrate interface leading to higher substrate-clad interfacial strengths.

(5) The CrC—CrC interparticle bond strength will also be enhanced compared to conventional spraying or conventional powder metallurgy techniques leading to higher erosion and wear resistance.

(6) The presence of a good adherence binder will also result in higher thermal stress cracking resistance.

(7) A multiplicity of components can be fabricated (canned) in one cycle, thus process consistencies can be accomplished and the process economics is thus favorable in the long run.

(8) The vacuum environment within the can (container) results in the clad and the clad interface being gas free, thus significantly enhancing the corrosion resistance due to lack of the species, e.g. $H_2$.

(9) The clads will be essentially crack free and possess a higher rupture strength.

(10) A multiplicity of components may be processed during the same HIP cycle thus ensuring process consistencies and favorable process economics.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

We claim:

1. A method of forming a coating on a sealing surface of a sealing assembly component, said forming method comprising the steps of:
   (a) processing a powder composed of a mixture of ceramic particles and a metal binder so as to substantially reduce the gas content of the mixture and at least partially coat the ceramic particles with the metal binder;
   (b) applying the powder mixture onto a groove formed on the sealing surface of the sealing assembly component to form a coating thereon;
   (c) encasing at least the coating on the sealing surface by applying a metallic cover thereover;
   (d) evacuating the atmosphere between the cover and coating on the sealing surface; and
   (e) hot isostatic pressing the sealing assembly component and the coating thereon encased by the cover in a manner which densifies the coating to substantially its full theoretical density, metallurgically bonds the coating to the surface of the sealing assembly component at the groove thereon, and wets the ceramic particles with the metal binder and forms an interparticle bond between the ceramic particles wetted by the metal binder;
   (f) said powder processing including
      (i) mixing the ceramic particles and metal binder to produce a mixture thereof,
      (ii) heating the mixture of ceramic particles and metal binder to the melting point of the metal binder which is less than the melting point of the ceramic particles to produce a mass of ceramic particles coated with molten metal binder and having a reduced gas content,
      (iii) cooling the mass of ceramic particles coated with molten metal binder to produce a solid mass thereof, and
      (iv) pulverizing the solid mass of metal binder coated-ceramic particles to granulate the powder mixture of ceramic particles to the desired size and still at least partially coated with metal binder.

2. The forming method as recited in claim 1, wherein said applying includes depositing the powder mixture in a loose condition.

3. The forming method as recited in claim 1, wherein said applying includes depositing the powder mixture in a partly consolidated condition as a preform.

4. The forming method as recited in claim 1, wherein said encasing is carried out by welding the cover to the surface of the sealing assembly component so as to seal the coating thereon from the external atmosphere.

5. The forming method as recited in claim 1, wherein said encasing is carried out by enclosing the sealing assembly component and coating thereon in a sealed metallic container.

6. The forming method as recited in claim 1, wherein said hot isostatic pressing of the sealing assembly component and the coating thereon encased by the cover occurs at an elevated temperature below and close to the melting point of the metal binder.

7. The forming method as recited in claim 6, wherein the elevated temperature of said hot isostatic pressing is within 200° C. of the melting point of the metal binder.

8. The forming method as recited in claim 1, further comprising:
   (f) cooling at a predetermined rate the sealing assembly component and the coating thereon encased by the cover; and (g) after cooling thereof, removing the cover from the coating.

9. The forming method as recited in claim 8, wherein said cooling is carried out at a rate of about 100° C. per hour.

10. A method of forming an annular coating on an annular sealing surface of a stainless steel sealing assembly component for use in a nuclear reactor coolant pump, said forming method comprising the steps of:
   (a) processing a powder composed of a mixture of ceramic particles and a metal binder so as to substantially reduce the gas content of the mixture and at least partially coat the ceramic particles with the metal binder;
   (b) applying the powder mixture onto a groove formed on the sealing surface of the sealing assembly component to form a coating thereon;
   (c) encasing at least the coating on the sealing surface by applying a metallic cover thereover;
   (d) evacuating the atmosphere between the cover and coating on the sealing surface;
   (e) hot isostatic pressing the sealing assembly component and the coating thereon encased by the cover in a manner which densifies the coating to substantially its full theoretical density, metallurgically bonds the coating to the surface of the sealing assembly component at the groove thereon, and wets the ceramic particles with the metal binder and forms an interparticle bond between the ceramic particles wetted by the metal binder;
   (f) said powder processing including
      (i) mixing the ceramic particles and metal binder to produce a mixture thereof,
      (ii) heating the mixture of ceramic particles and metal binder to the melting point of the metal binder which is less than the melting point of the ceramic particles to produce a mass of ceramic particles coated with molten metal binder and having a reduced gas content,
      (iii) cooling the mass of ceramic particles coated with molten metal binder to produce a solid mass thereof, and
      (iv) pulverizing the solid mass of metal binder coated-ceramic particles to granulate the powder mixture of ceramic particles to the desired size and still at least partially coated with metal binder.

11. The forming method as recited in claim 10, wherein said applying includes depositing the powder mixture in a loose condition.

12. The forming method as recited in claim 10, wherein said applying includes depositing the powder mixture in a partly consolidated condition as a preform.

13. The forming method as recited in claim 10, wherein said encasing is carried out by welding the cover to the surface of the sealing assembly component so as to seal the coating thereon from the external atmosphere.

14. The forming method as recited in claim 10, wherein said encasing is carried out by enclosing the sealing assembly component and coating thereon in a sealed metallic container.

15. The forming method as recited in claim 10, wherein said hot isostatic pressing of the sealing assembly component and the coating thereon encased by the cover occurs at an elevated temperature below and close to the melting point of the metal binder.

16. The forming method as recited in claim 15, wherein the elevated temperature of said hot isostatic pressing is within 100° C. of the melting point of the metal binder.

17. The forming method as recited in claim 10, further comprising:
   (f) cooling at a predetermined rate the sealing assembly component and the coating thereon encased by the cover; and
   (g) after cooling thereof, removing the cover from the coating.

18. The forming method as recited in claim 17, wherein said cooling is carried out at a rate of about 100° C. per hour.

* * * * *